United States Patent [19]
Dion et al.

[11] Patent Number: 5,244,341
[45] Date of Patent: Sep. 14, 1993

[54] LATH PLACER

[76] Inventors: Clancy Dion; Grant Redden, both of R.R.#8, Box 20 Airport Road, Quensnel, B.C., Canada, V2J 5E6

[21] Appl. No.: 874,816

[22] Filed: Apr. 28, 1992

[30] Foreign Application Priority Data

Aug. 2, 1991 [CA] Canada .................................. 2048356

[51] Int. Cl.$^5$ ............................................. B65G 57/18
[52] U.S. Cl. .................... 414/789.5; 414/797
[58] Field of Search ............................. 414/789.5, 797

[56] References Cited

U.S. PATENT DOCUMENTS

| 3,737,034 | 6/1973 | Icard . | |
|---|---|---|---|
| 3,738,510 | 6/1973 | Mason | 414/789.5 |
| 4,090,618 | 5/1978 | Lehmann | 414/789.5 |
| 4,253,787 | 3/1981 | Lunden . | |
| 4,264,253 | 4/1981 | Kennison . | |
| 4,324,520 | 4/1982 | Kjellberg . | |
| 4,553,892 | 11/1985 | Huffman et al. . | |
| 4,801,233 | 1/1989 | Ritola . | |
| 4,810,152 | 3/1989 | Gillingham et al. . | |
| 4,878,803 | 11/1989 | Whiddon . | |

Primary Examiner—Richard A. Schacher
Attorney, Agent, or Firm—Chernoff, Vilhauer, McClung & Stenzel

[57] ABSTRACT

A device for use in a lumber mill for placing lath binders and stickers onto stacks of lumber, and in particular a lath placer using a rotating delivery system for placing lathing or stickers onto stacks of lumber, the system incorporating vacuum assisted delivery and either a slip clutch or torque reducer between the drive assembly and the rotating delivery assembly. Preferably the lath placer comprises a transfer device for transferring in a substantially circular arc a lath from a lath magazine to a stack of lumber. The transfer device comprises a reversible, selectively rotatable structure rotatable between a lath engaging position and a lath releasing position. The structure comprises a supporting structure supporting a selectively actuable vacuum gripping device for releasably gripping the lath by a selectively actuable vacuum applied between the lath and the gripping device.

68 Claims, 3 Drawing Sheets

LATH PLACER

FIELD OF THE INVENTION

This invention relates to the field of sticker or lath binder placement machines for placing stickers or lath binders onto stacks of lumber, and in particular, relates to a lath placement machine incorporating a vacuum assisted rotating delivery system.

BACKGROUND OF THE INVENTION

Saw mills typically cut lumber, such as 2×4's and the like, on what might be described as a conveyor belt operation. The finished products arrive at the end of the conveyor belt and are stacked horizontally using forks which lay a tier of lumber onto a stack of such lumber. The stack of lumber are stacked on a hoist which lowers the stack by the depth of one tier every time a new tier is added. In this way the elevation of the forks does not have to be changed in order to add a new tier to the stack. For example, if the finished products are 2×4 then the hoist will lower the stack by 2 inches every time a new tier is added. The forks will typically deliver ten 2×4's and deposit them horizontally as a new tier onto the stack.

Stacks of lumber, such as 2×4's, must be stabilized by using what are called "binders". Typically binders are wooden lathing which, after a certain number of tiers have been placed onto the stack, are laid transversely across the stack before the next tier of planks is added. The lathing will typically be aligned at right angles to the lumber and laid across a tier at approximately 5 foot intervals. In the case of 2×4's, binders are typically placed onto the stack after every seven tiers.

In the prior art, many machines have been devised for placing laths and what are commonly referred to as "stickers", onto stacks of lumber. Stickers are placed between individual tiers of green, that is, newly cut, lumber so as to allow drying of the lumber. Typically sticker placing machines incorporate elaborate and bulky conveyor mechanisms for feeding stickers into pockets, chutes or cam-like feeding devices so that stickers may be transferred to, and laid transversely across, a stack of lumber before the next layer of lumber is added to the stack. A frequent problem recited in the prior art in handling of such stickers is that typically the stickers will not be of uniform thickness and will be warped or otherwise deformed thereby making automatic handling difficult.

Attempts have been made in the prior art to overcome such difficulties, notably by Whiddon, U.S. Pat. No. 4,878,803 issued 7 Nov. 1989, who disclosed a system mounted to a translatable carriage whereby finger-like gripping means would pick up the stickers individually from a sticker conveyor and release them onto the lumber stack once the translatable carriage moved the sticks from the sticker conveyor to a position over the lumber stack.

A system employing vacuum means for picking up lumber and stickers has been previously disclosed by Icard, U.S. Pat. No. 3,737,034 issued 5 Jun., 1973. Icard teaches using elongated vacuum conveyor belts for unstacking tiers of lumber from stacks of lumber. The mechanism is adapted to pick up an entire tier of lumber, and any associated stickers lying loose on top of the tier, by applying a vacuum to a spaced parallel array of conveyor belts. The belts are only adapted to adhere to the lumber itself and not the stickers.

A system employing a rotary machine for placing stickers has been previously disclosed by Kennison, U.S. Pat. No. 4,264,253 issued 28 Apr., 1981. Kennison teaches using a notched rotary wheel for receiving stickers from a vertical gravity feed stack. Stickers are received in the wheel notches and deposited onto a lumber stack positioned beneath the wheel. Stickers are deposited as the wheel is rotated causing the stickers to fall from the notches. It can be seen however that the mechanism will jam if warped stickers or stickers which are uneven or too thick or too thin are fed from the gravity feed stack into the wheel notches.

The present invention addresses the difficulties in systematically placing lathing or stickers onto a lumber stack so as not to interfere with the efficient delivery of finished planks onto the stack. The present invention is a delivery system for placing laths or stickers which, because of its simplicity, is inherently reliable, and is sufficiently compact so as not to interfere with the operation of the mill.

Hereinafter I will refer to laths, stickers or like substantially flat-sided members collectively as laths or lathing.

SUMMARY OF THE INVENTION

The present invention comprises a rotary delivery device for placing lathing in a stack of lumber. Preferably the lath placer device comprises a transfer means for transferring in a substantially circular arc a lath from a lath magazine to a stack of lumber. The transfer means is rotatable between a lath engaging position and a lath releasing position. The transfer means comprises a selectively actuable vacuum gripping means for releasably gripping the lath by a selectively actuable vacuum applied between the lath and the gripping means.

Each device comprises a central transversely aligned hollow tube from which extends a radial arm. The gripping means is mounted adjacent an end of the radial arm. The radial arm is comprised of a rigid hollow duct attached at one end to the tube, and at the other end to the gripping means, a vacuum bar having an elongate aperture in the axial direction. The tube and arm comprise a hollow interior communicating between the gripping means and a source of vacuum. The elongate aperture opens in a circumferential direction.

A stack of lathing maybe arranged circumferentially in a curved magazine so as to fall within the arc of rotation of the vacuum bar. Thus, when the tube is rotated, the duct and vacuum bar are also rotated so as to bring the vacuum bar into contact with the uppermost lath in the magazine. The vacuum across the face of elongate aperture in the vacuum bar causes the lath to adhere to the vacuum bar. The tube is then rotated in the opposite direction so as to rotate the vacuum bar away from the magazine, thus, presuming a vacuum has been applied to the longitudinal tube, removing the uppermost lath from the stack in the magazine. The vacuum bar holding the lath is then rotated until the lath is held over the stack of lumber. The vacuum is then removed and the lath is consequently released from the vacuum bar to fall onto the stack. The source of vacuum may be any conventional vacuum source. The vacuum may be selectively regulated by conventional damper or guillotine means mounted between the tube and the vacuum source.

The structure supporting the lath magazine supports bearings in which the transverse tube, and the axle extending from the sealed end of the tube, are journalled. Torque is applied to the axle on the sealed end of the tube so as to rotate the tube. The direction of torque is reversible so that the tube can be rotated in both directions.

Conventional reversible drive assemblies are used to apply the torque to the tube. A slip clutch or torque reducer is placed in the drive train for driving the tube, so that when the vacuum bar reaches either the lath pick-up point (when it comes in contact with the top lath in the magazine) or the bottom point of its travel (a mechanical stop extends from the frame supporting the tube so as to stop rotation of the vacuum bar when the vacuum bar is directly over the stack of lumber) the drive assembly may continue turning without damaging the tube, duct, or vacuum bar. As laths are removed from the magazine, the lath pick-up point of the vacuum bar shifts, that is, the bar rotates on each cycle until the next lath in the magazine stops the rotation of the bar.

In order to assist rotation of the tube, counterweights are affixed to the tube in opposed relation to the duct and vacuum bar.

The lath placer of the present invention enables the delivery of a thinner lath to the lumber bundles than has heretofore been reliably been obtained. This in turn reduces the total height of lumber bundles, allowing more lumber to be shipped under regulated rail heights. The present invention also allows for lumber producers to buy cheaper lath and at the same time save shipping space when the laths are shipped. No prior art lath placers of which we are aware can deliver lath as thin as approximately 50 thousandths of an inch without problems that lead to lost mill production.

The lath placer of the present invention is capable of placing thin lathing due to its vacuum delivery system. The vacuum delivery system also allows the use of lath which is made from veneer clipped into laths. This reduces saw dust waste and allows lath producers to attain a better recovery as compared to laths sawed from offgrade lumber.

The lath placer of the present invention will also deliver warped, broken, or bent lath of many grades or thicknesses. It will deliver varying thicknesses and lengths without any adjustments to the placer. This reduces adjustment and maintenance down time.

BRIEF DESCRIPTION OF THE DRAWINGS

In drawings which illustrate specific embodiments of the invention, but which should not be construed as restricting the scope of the invention in any way.

DETAILED DESCRIPTION OF THE PREFERRED EMBODIMENT

Figure 1:
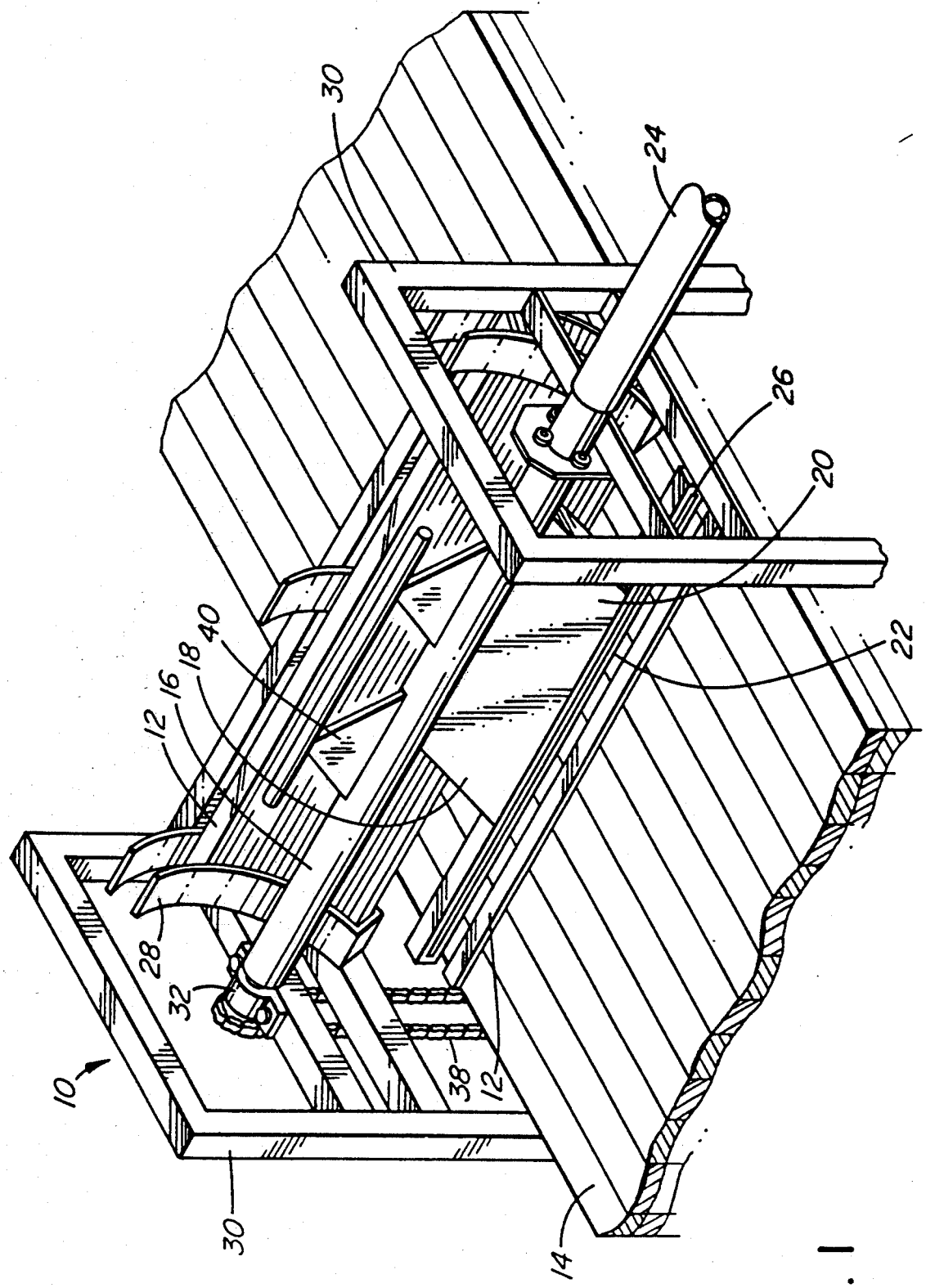
FIG. 1 is a perspective view of a lath placing device constructed in accordance with the present invention.
Figure 2:
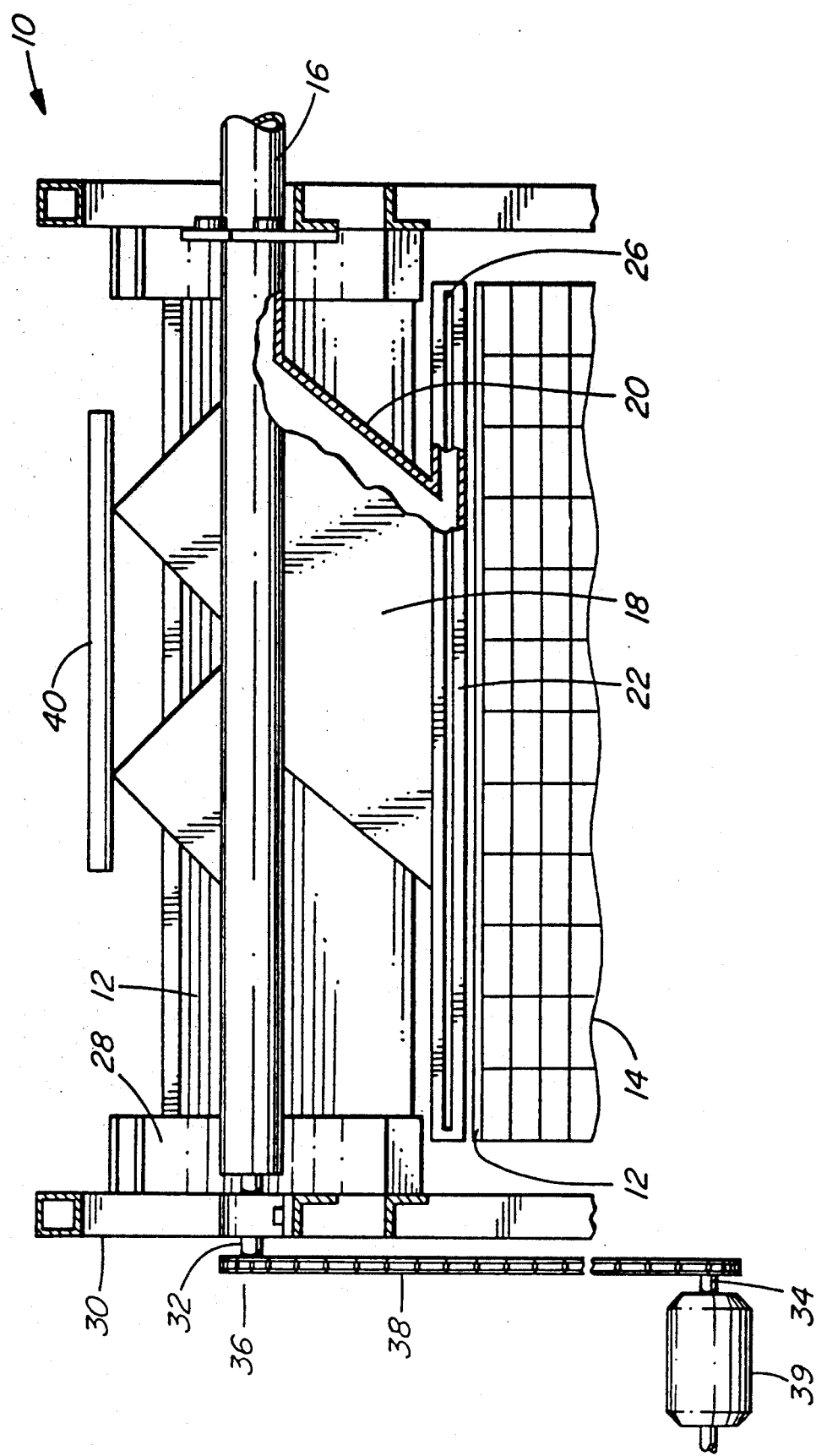
FIG. 2 is a partially cutaway cross-sectional view taken along line 2—2 in FIG. 4 of a lath placing device constructed in accordance with the principles of the present invention.

As illustrated in FIG. 1, the present invention comprises a rotary delivery device 10 for placing lathing 12 for use as binders or stickers in a stack of lumber 14. Each device 10 comprises a central transversely aligned tube 16 from which extends a radial arm 18. Radial arm 18 is comprised of a rigid duct 20 attached at one end to tube 16, and at the other end to a vacuum bar 22. Tube 16 and duct 20 are hollow (best seen in partial cut-away in FIG. 4), duct 20 communicating with tube 14 through opening 17. Tube 16 and duct 20 are operatively connected to a vacuum means (not shown) via a vacuum hose 24 so that when a vacuum is applied to one end of tube 16 (the other end being sealed), a vacuum is applied across the face of an elongate aperture 26 (seen best in FIG. 2) in vacuum bar 22. The vacuum applied across the face of elongate aperture 26 may be selectively removed by actuating a guillotine valve or damper (not shown) on hose 24.

Figure 3:
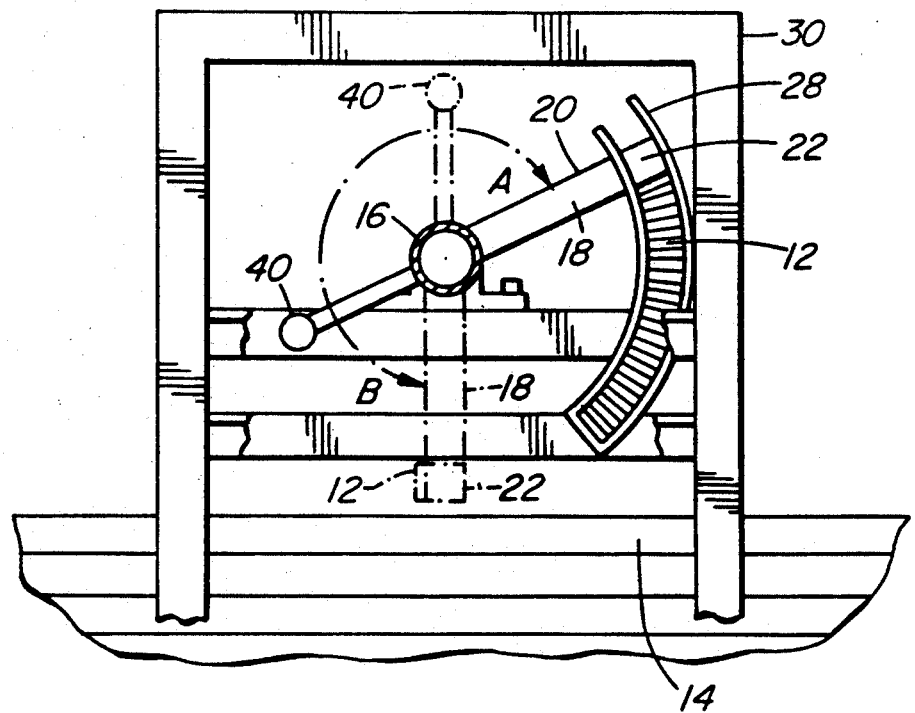
FIG. 3 is a partially cutaway side elevation view of a lath placing device constructed in accordance with the principles of the present invention illustrating a lath being removed from the lath magazine.

A curved magazine 28 is provided so that lath 12 may be stacked circumferentially so as to fall within the arc of rotation of vacuum bar 22. When tube 16 is rotated in a first direction A (see FIG. 3), duct 20 and vacuum bar 22 are also rotated so as to bring vacuum bar 22 into contact with the uppermost lath 12 in magazine 28. The vacuum applied across the face of aperture 26 in vacuum bar 22 causes the uppermost lath 12 to adhere to the face of vacuum bar 22. Tube 16 may then be rotated in an opposite direction B so as to rotate vacuum bar 22 away from magazine 28, thus removing the uppermost lath 12 from the stack in the magazine. Vacuum bar 22, holding lath 12 against the face of aperture 26 by the applied vacuum, is rotated until vacuum bar 22 hits a mechanical stop (not shown) extending from frame 30 and lath 12 is held over the stack of lumber 14. The vacuum is then removed by closing the guillotine valve or damper and lath 12 is consequently released from vacuum bar 22 to fall onto the stack of lumber 14.

Structure 30 supporting magazine 28 also supports bearings (not shown) in which tube 16 and axle 32, extending from the sealed end of the tube, are journalled. Torque is applied to tube 16 via drive shaft 34, slip clutch 36 and drive chain 38. The drive means 39 is reversible so that the direction of torque applied to tube 16 may be reversed so as to rotate tube 16 in both directions A and B. Drive means 39 is a conventional reversible drive assembly.

Figure 4:
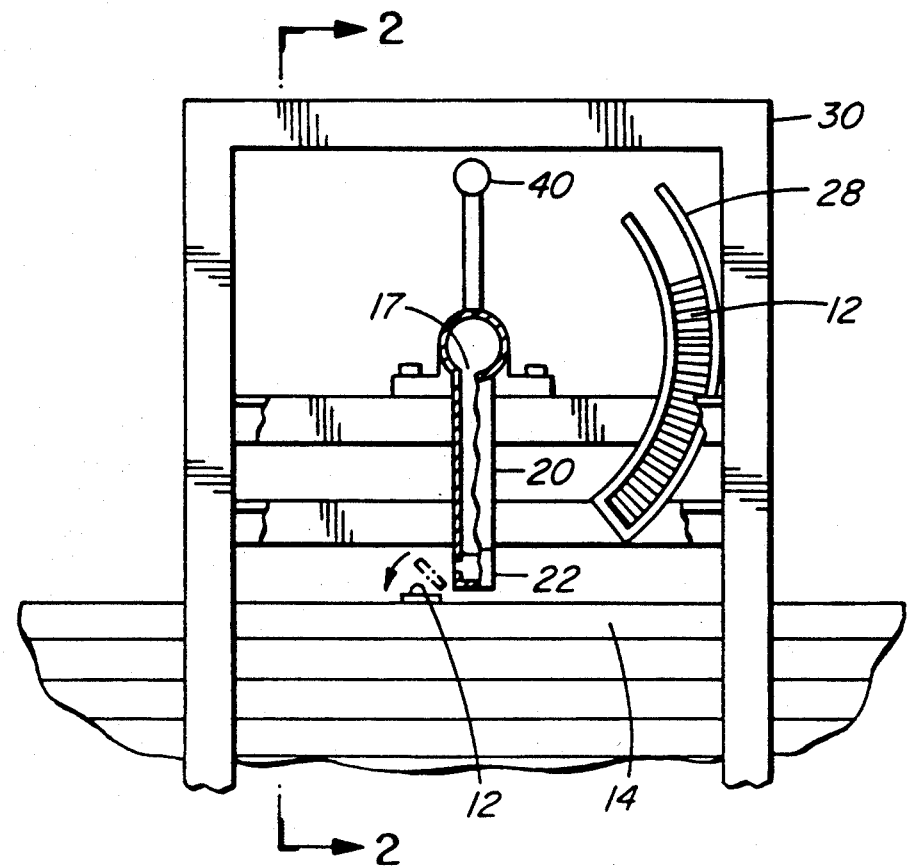
FIG. 4 is a partially cutaway side elevation view of a lath placing device constructed in accordance with the principles of the present invention illustrating a lath being placed onto the lumber stack.

Slip clutch 36 is placed on axle 32 so that when vacuum bar 22 is rotated either to its lath pick-up point (that is, when vacuum bar 22 comes into contact with the uppermost lath 12 in magazine 28) or the bottom point (when a mechanical stop, not shown, extending from structure 30 stops rotation of vacuum bar 22 when vacuum bar 22 is directly over the stack of lumber 14, as illustrated in FIG. 4) the drive assembly is allowed to continue turning without damaging tube 16, duct 20 or vacuum bar 22. As laths 12 are removed from magazine 28 the lath pick-up point shifts, that is, vacuum bar 22 rotates on each cycle until the next lath 12 in magazine 28 stops the rotation in direction A of vacuum bar 22.

Vacuum bar 22 is rotated in a cycle from a position picking up the uppermost lath 12 from magazine 28 (the point at which vacuum is applied across aperture 26), to a position over stack 14 where, when the vacuum is removed, lath 12 falls onto the stack, to a return position where vacuum bar 22 is resting against the next uppermost lath 12 in magazine 28.

In order to assist rotation of tube 16, counterweights 40 are mounted to tube 16 in opposed relation to duct 20 and vacuum bar 22.

As will be apparent to those skilled in the art in the light of the foregoing disclosure, many alterations and modifications are possible in the practice of this invention without departing from the spirit or scope thereof. For example, a straight lath magazine could be substituted for curved magazine 28, with means provided, such as springs, to move the lath pieces into position for pick-up by bar 22. Accordingly, the scope of the invention is to be construed in accordance with the substance defined by the following claims.

What is claimed is:

1. A lath placing machine for placing laths onto a stack of lumber comprising means for transferring, in a substantially circular arc, a lath from a lath magazine to a stack of lumber, wherein said means for transferring is rotatable between a lath engaging position and a lath releasing position, said means for transferring comprising a gripping means.

2. The machine of claim 1 wherein said gripping means comprises a selectively actuable vacuum gripping means for releasably gripping said lath by a selectively actuable vacuum applied between said lath and said gripping means.

3. The machine of claim 2 wherein said means for transferring comprises a radially extending arm and said gripping means is mounted adjacent an end of said arm.

4. The machine of claim 3 wherein said arm comprises a hollow interior communicating between said gripping means and a source of vacuum.

5. The machine of claim 4 wherein said gripping means comprises an elongate aperture extending in an axial direction, said aperture opening in the circumferential direction.

6. The machine of claim 5 wherein said means for transferring comprises a hollow axially extending tube, and said arm is mounted for rotation on said tube.

7. The machine of claim 6 wherein said hollow tube may be connected at one end to said vacuum hose and is sealed at its other end.

8. The machine of claim 2 wherein said means for transferring may be drivingly connected via drive transfer means to a selectively reversible drive means.

9. The machine of claim 8 wherein said drive transfer means comprises a slip clutch.

10. The machine of claim 9 wherein said drive transfer means further comprises a drive chain drivingly connected between said slip clutch and said means for transferring.

11. The machine of claim 8 wherein said drive transfer means comprises a torque reducer.

12. The machine of claim 11 wherein said drive transfer means further comprises a drive chain drivingly connected between said torque reducer and said means for transferring.

13. The machine of claim 10 or claim 12 wherein said drive transfer means further comprises an axle extending between said drive chain and said means for transferring.

14. The machine of claim 2 wherein said lath magazine is curved and mounted in proximity to said means for transferring so as to fall within the arc of rotation of said vacuum gripping means.

15. The machine of claim 14 wherein said magazine is adapted to hold laths in a curved stack of said laths whereby said stack falls within the arc of rotation of said gripping means and each of said laths may be individually removed from said magazine by said gripping means.

16. The machine of claim 5 wherein said elongate aperture is aligned so as to snugly engage in a substantially air tight seal a lath in a stack of such laths in said magazine when said means for transferring is in said lath engaging position.

17. The machine of claim 16 wherein said magazine is curved so that said stack of said laths is held by said magazine within the arc of rotation of said elongate aperture and thus said laths are individually removable from said magazine in a progression whereby said elongate aperture removes the uppermost of said laths from said stack each time said means for transferring is in said lath engaging position and said vacuum is applied.

18. The machine of claim 17 wherein, with said vacuum applied and said means for transferring in said lath engaging position, said uppermost lath in said stack adheres to said elongate aperture so as to be carried through said substantially circular arc into proximity with said stack of lumber when said means for transferring is rotated to said lath releasing position.

19. The machine of claim 18 wherein said lath adhered to said elongate aperture may be released from said elongate aperture, so as to be placed onto said stack of lumber, by removing said vacuum from between said lath and said elongate aperture when said means for transferring is in said lath releasing position.

20. The machine of claim 19 wherein the axis of rotation of said means for transferring is substantially horizontal and transverse to said stack of lumber.

21. The machine of claim 20 wherein said hollow tube, elongate aperture and curved magazine are aligned substantially transversely to said stack of lumber.

22. The machine of claim 3 wherein said arm is extending downwardly and substantially vertically when said means for transferring is in said lath releasing position.

23. The machine of claim 21 wherein said means for transferring further comprises a counter-weight mounted to said hollow tube in opposed relation to said radial arm.

24. A lath placing machine for placing laths onto a stack of lumber comprising means for transferring a lath from a lath magazine to a stack of lumber, wherein said means for transferring is movable between a lath engaging position and a lath releasing position, said means for transferring comprising a selectively actuable vacuum gripping means for releasably gripping said lath by a selectively actuable vacuum applied between said lath and said gripping means.

25. The machine of claim 24 wherein said means for transferring is movable in a substantially circular arc and is rotable between said lath engaging position and said lath releasing position.

26. The machine of claim 25 wherein said means for transferring comprises a radially extending arm and said gripping means is mounted adjacent an end of said arm.

27. The machine of claim 26 wherein said arm comprises a hollow interior communicating between said gripping means and a source of vacuum.

28. The machine of claim 27 wherein said gripping means comprises an elongate aperture extending in an axial direction, said aperture opening in the circumferential direction.

29. The machine of claim 28 wherein said means for transferring comprises a hollow axially extending tube, and said arm is mounted for rotation on said tube.

30. The machine of claim 29 wherein said hollow tube may be connected at one end to said vacuum hose and is sealed at its other end.

31. The machine of claim 25 wherein said means for transferring may be drivingly connected via drive transfer means to a selectively reversible drive means.

32. The machine of claim 31 wherein said drive transfer means comprises a slip clutch.

33. The machine of claim 32 wherein said drive transfer means further comprises a drive chain drivingly connected between said slip clutch and said means for transferring.

34. The machine of claim 31 wherein said drive transfer means comprises a torque reducer.

35. The machine of claim 34 wherein said drive transfer means further comprises a drive chain drivingly connected between said torque reducer and said means for transferring.

36. The machine of claim 33 or claim 35 wherein said drive transfer means further comprises an axle extending between said drive chain and said means for transferring.

37. The machine of claim 25 wherein said lath magazine is curved and mounted in proximity to said means for transferring so as to fall within the arc of rotation of said vacuum gripping means.

38. The machine of claim 37 wherein said magazine is adapted to hold laths in a curved stack of said laths whereby said stack falls within the arc of rotation of said gripping means and each of said laths may be individually removed from said magazine by said gripping means.

39. The machine of claim 28 wherein said elongate aperture is aligned so as to snugly engage in a substantially air tight seal a lath in a stack of such laths in said magazine when said means for transferring is in said lath engaging position.

40. The machine of claim 39 wherein said magazine is curved so that said stack of said laths is held by said magazine within the arc of rotation of said elongate aperture and thus said laths are individually removable from said magazine in a progression whereby said elongate aperture removes the uppermost of said laths from said stack each time said means for transferring is in said lath engaging position and said vacuum is applied.

41. The machine of claim 40 wherein, with said vacuum applied and said means for transferring in said lath engaging position, said uppermost lath in said stack adheres to said elongate aperture so as to be carried through said substantially circular arc into proximity with said stack of lumber when said means for transferring is rotated to said lath releasing position.

42. The machine of claim 41 wherein said lath adhered to said elongate aperture may be released from said elongate aperture, so as to be placed onto said stack of lumber, by removing said vacuum from between said lath and said elongate aperture when said means for transferring is in said lath releasing position.

43. The machine of claim 42 wherein the axis of rotation of said means for transferring is substantially horizontal and transverse to said stack of lumber.

44. The machine of claim 43 wherein said hollow tube, elongate aperture and curved magazine are aligned substantially transversely to said stack of lumber.

45. The machine of claim 26 wherein said arm is extending downwardly and substantially vertical when said means for transferring is in said lath releasing position.

46. The machine of claim 44 wherein said means for transferring further comprises a counter-weight mounted to said hollow tube in opposed relation to said radial arm.

47. A lath placing machine for placing laths onto a stack of lumber comprising means for transferring, in a substantially circular arc, a lath from a lath magazine to a stack of lumber, wherein said means for transferring is rotatable between a lath engaging position and a lath releasing position, said means for transferring comprising a selectively actuable vacuum gripping means for releasably gripping said lath by a selectively actuable vacuum applied between said lath and said gripping means.

48. The machine of claim 47 wherein said means for transferring comprises a radially extending arm and said gripping means is mounted adjacent an end of said arm.

49. The machine of claim 48 wherein said arm comprises a hollow interior communicating between said gripping means and a source of vacuum.

50. The machine of claim 49 wherein said gripping means comprises an elongate aperture extending in an axial direction, said aperture opening in the circumferential direction.

51. The machine of claim 50 wherein said means for transferring comprises a hollow axially extending tube, and said arm is mounted for rotation on said tube.

52. The machine of claim 51 wherein said hollow tube may be connected at one end to said vacuum hose and is sealed at its other end.

53. The machine of claim 47 wherein said means for transferring may be drivingly connected via drive transfer means to a selectively reversible drive means.

54. The machine of claim 53 wherein said drive transfer means comprises a slip clutch.

55. The machine of claim 54 wherein said drive transfer means further comprises a drive chain drivingly connected between said slip clutch and said means for transferring.

56. The machine of claim 53 wherein said drive transfer means comprises a torque reducer.

57. The machine of claim 56 wherein said drive transfer means further comprises a drive chain drivingly connected between said torque reducer and said means for transferring.

58. The machine of claim 55 or claim 57 wherein said drive transfer means further comprises an axle extending between said drive chain and said means for transferring.

59. The machine of claim 47 wherein said lath magazine is curved and mounted in proximity to said means for transferring so as to fall within the arc of rotation of said vacuum gripping means.

60. The machine of claim 59 wherein said magazine is adapted to hold laths in a curved stack of said laths whereby said stack falls within the arc of rotation of said gripping means and each of said laths may be individually removed from said magazine by said gripping means.

61. The machine of claim 51 wherein said elongate aperture is aligned so as to snugly engage in a substantially air tight seal a lath in a stack of such laths in said magazine when said means for transferring is in said lath engaging position.

62. The machine of claim 61 wherein said magazine is curved so that said stack of said laths is held by said magazine within the arc of rotation of said elongate aperture and thus said laths are individually removable from said magazine in a progression whereby said elongate aperture removes the uppermost of said laths from said stack each time said means for transferring is in said lath engaging position and said vacuum is applied.

63. The machine of claim 62 wherein, with said vacuum applied and said means for transferring in said lath engaging position, said uppermost lath in said stack adheres to said elongate aperture so as to be carried through said substantially circular arc into proximity with said stack of lumber when said means for transferring is rotated to said lath releasing position.

64. The machine of claim 63 wherein said lath adhered to said elongate aperture may be released from said elongate aperture, so as to be placed onto said stack of lumber, by removing said vacuum from between said lath and said elongate aperture when said means for transferring is in said lath releasing position.

65. The machine of claim 64 wherein the axis of rotation of said means for transferring is substantially horizontal and transverse to said stack of lumber.

66. The machine of claim 65 wherein said hollow tube, elongate aperture and curved magazine are aligned substantially transversely to said stack of lumber.

67. The machine of claim 48 wherein said arm is extending downwardly and substantially vertical when said means for transferring is in said lath releasing position.

68. The machine of claim 67 wherein said means for transferring further comprises a counter-weight mounted to said hollow tube in opposed relation to said radial arm.

* * * * *